United States Patent [19]

Saiji

[11] Patent Number: 4,509,112
[45] Date of Patent: Apr. 2, 1985

[54] SMALL PROGRAMMABLE COMPUTER

[75] Inventor: Mitsuhiro Saiji, Kyoto, Japan

[73] Assignee: Sharp Kabushiki Kaisha, Osaka, Japan

[21] Appl. No.: 315,885

[22] Filed: Oct. 28, 1981

[30] Foreign Application Priority Data

Oct. 28, 1980 [JP] Japan ............................... 55-152857

[51] Int. Cl.³ ............................................... G06F 7/04
[52] U.S. Cl. .................................................. 364/200
[58] Field of Search ... 364/200 MS File, 900 MS File, 364/706

[56] References Cited

U.S. PATENT DOCUMENTS 3,585,599  6/1971  Hitt et al. ............................ 364/200
3,828,327  8/1974  Berglund et al. .................... 364/200
3,928,857  12/1975  Carter et al. ....................... 364/200
4,063,221  12/1977  Watson et al. ...................... 364/900

Primary Examiner—Raulfe B. Zache
Attorney, Agent, or Firm—Birch, Stewart, Kolasch & Birch

[57] ABSTRACT

An improved programmable computer prevents the contents of statements previously stored from being erased inadvertently. The computer is programmed using line identifying numbers or indices. During introduction of a new index as a line identifying number it is determined whether that index has been already programmed and, if programmed, the contents of a previously programmed statement corresponding to the line number to be inputted is displayed.

5 Claims, 4 Drawing Figures

SMALL PROGRAMMABLE COMPUTER

BACKGROUND OF THE INVENTION

This invention relates to small programmable computers such as programmable desk-top calculators, personal computers and the like.

Programmable computers capable of storing a string of processing steps are very convenient when it is desired to store a string of computing steps or complicated processing steps which are difficult to achieve by manual operations, particularly a variety of decision steps.

BASIC (Beginners All-purpose Symbolic Instruction Code) is one of the most popular programming languages, comprising a plurality of lines each bearing one or more statements (one or more formulas or instructions having at least one meaning). When it is desired to draw a line of a program, the following input operation is executed.

wherein ENTER indicates the completion of a line and is operated at the end of the line.

In the case where a line consists of two or more statements (this is called "multi-statement"), a colon (:) is placed between the statements. Integers from 1 through 99999 are usually used as line identifying numbers or indices for identification of the statements.

For example, in a program for evaluating selling amounts from unit price and quantity, the line numbers and statements are inputted in the following format.

```
10 INPUT A , SURYO
20 LET AMOUNT = A *SURYO:DISP AMOUNT
30 END
```

Since the computer usually executes processes automatically begining with the lowest line number, the respective lines are numbered according to the order of its associated processes (for example, 10, ... 20, ... 30).

INPUT: this instruction implies numbers or characters to be introduced and what follows INPUT is a variant to be loaded and stored.

LET: this implies the presence of a substitution sentence which is placed after LET.

DISP: this implies a variant or a formula following DISP to be displayed.

Whereas the conventional programmable computer is capable of storing a string of processing steps accompanied by such indices as the line identifying numbers for retrieval of lines each consisting of one or more statements, it has the following drawback. If a new program line is inputted, then this new line will replace the previous one having the same line number. The operator may not be aware of such replacement. For example, if the operator makes error in inputting the line numbers, the contents of the program will disappear in whole or in part. This objectionable situation occurs when the operator misunderstands the indices or incorrectly operates keys.

OBJECT AND SUMMARY OF THE INVENTION

Accordingly, it is an object of the present invention to provide a small programmable computer which is free of the above discussed problem.

It is another object of the present invention to provide an improved programmable computer which prevents the contents of statements previously stored from disappearing inadvertently by determining during introduction of an index such as a line identifying number whether that index has been already programmed and, if programmed, displaying the contents of a statement corresponding to the line number inputted.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
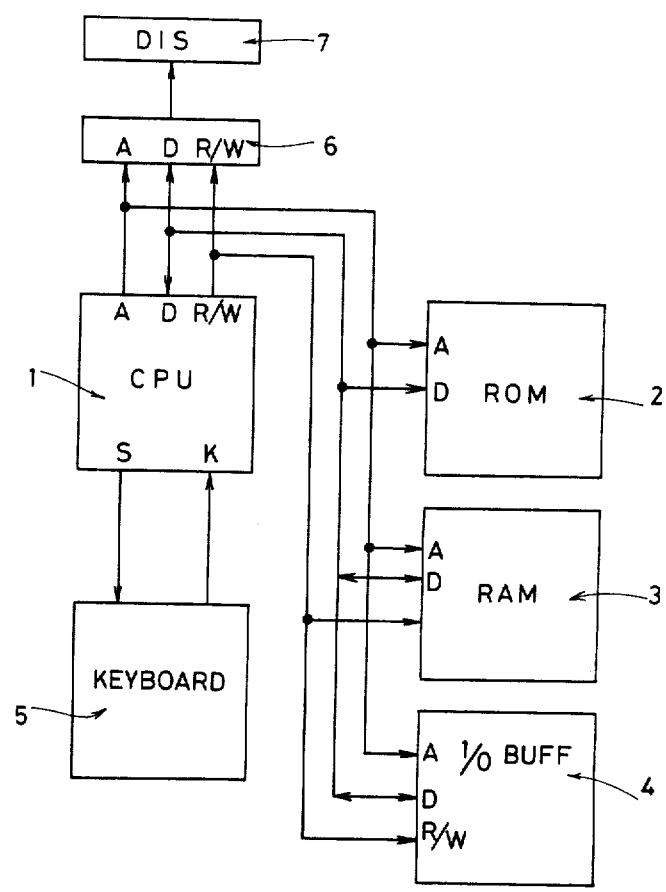
FIG. 1 is a system block diagram of a programmable computer according to an embodiment of the present invention.

Referring now to FIG. 1, there is illustrated a system block diagram of a programmable computer which comprises a central processing unit (CPU) 1, a read only memory (ROM) 2, a read/write memory (RAM) 3, an input/output buffer 4, a keyboard 5, a display memory/buffer 6 and a display 7. CPU 1 provides various controls as governed by instructions pre-stored in the ROM: The CPU (1) reads data input via the keyboard and supplies keyed codes to the input/output buffer, (2) unloads the contents of the RAM into the input/output buffer, (3) feeds data to the display buffer 6 in order to display the contents of the input/output buffer, (4) interprets a stored program in the RAM and executes calculations, decodes and displays inputs via the keyboard, (5) transfers the contents of the input/output buffer 4 into the RAM, etc. The ROM has previously stored therein sequences of instructions for decoding and prompting display of data input via the keyboard and for executing sequences as determined by stored programs in the RAM. RAM 3 is used to store programs and data and store temporarily the results of computations or other data. The input/output buffer is used to store temporarily the data input via the keyboard and the data to be displayed. The keyboard is a matrix arrangement and is supplied with strobe signals S from CPU 1 and outputs key signals K. Keyboard 5 includes alphanumeric keys, symbol keys and other keys. The input/output buffer 6 receives the data to be displayed and supplies the data to the display 7 after it is decoded. In an exemplary embodiment, the input/output buffer 4 has a capacity of 80 characters, the display memory/buffer has a capacity of 24 characters, and the display 7 is a 24-digit one line display panel.

Figure 2:
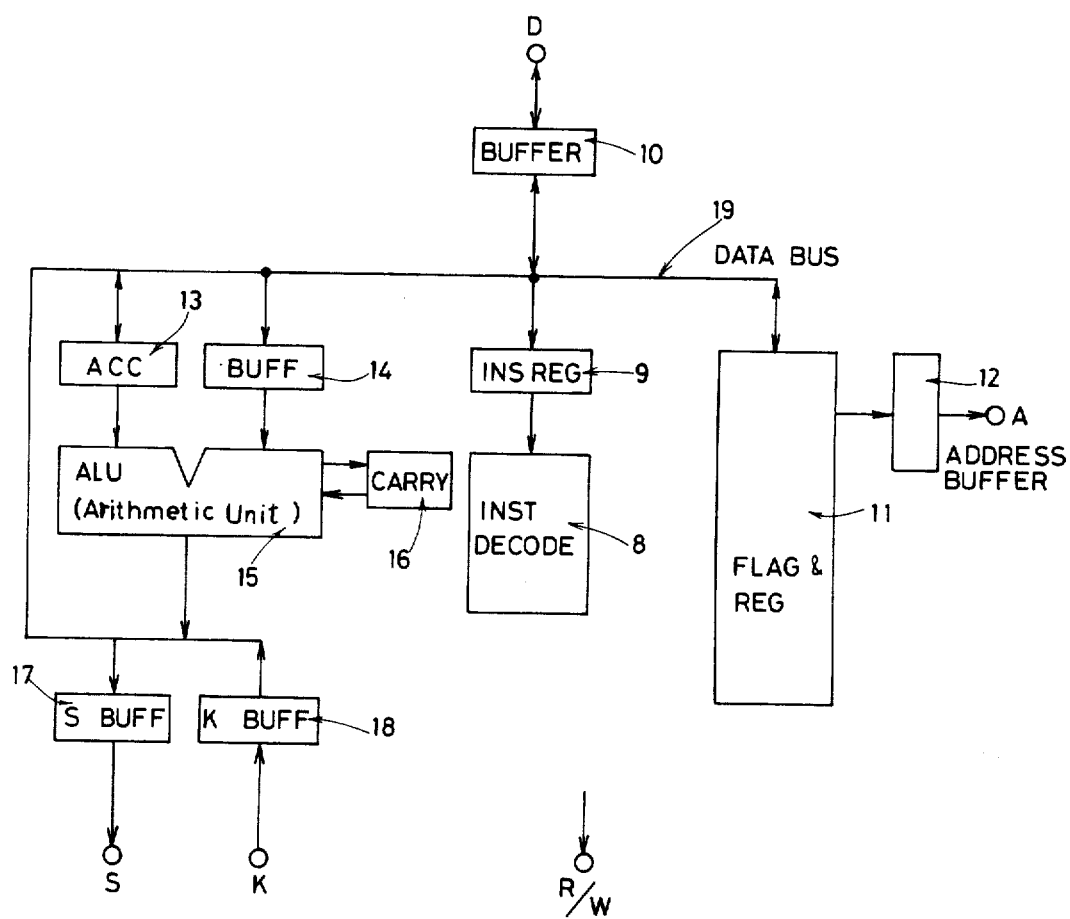
FIG. 2 is a detailed block diagram of a CPU shown in FIG. 2.

FIG. 2 is a block diagram showing CPU 1 of FIG. 1 in further detail. A data buffer 10 stores temporarily data during input and output steps. An address buffer 12 stores temporarily address information for the ROM, RAM, the input/output buffer and the display memory/buffer 6. There is further provided an accumulator 13, a temporary register 14, an arithmetic logic unit (ALU) 15 and a carry flag 16 in a well-known manner. An S buffer 17 is used to deliver the key strobe signals, while a K buffer 18 is used to receive the key signals from the keyboard. An instruction register 9 stores temporarily instruction codes as fetched from ROM 2. An instruction decoder 8 decodes the contents of the instruction decoder register 9 and supplies instruction signals. An internal data bus is designated as 19.

Figure 3:
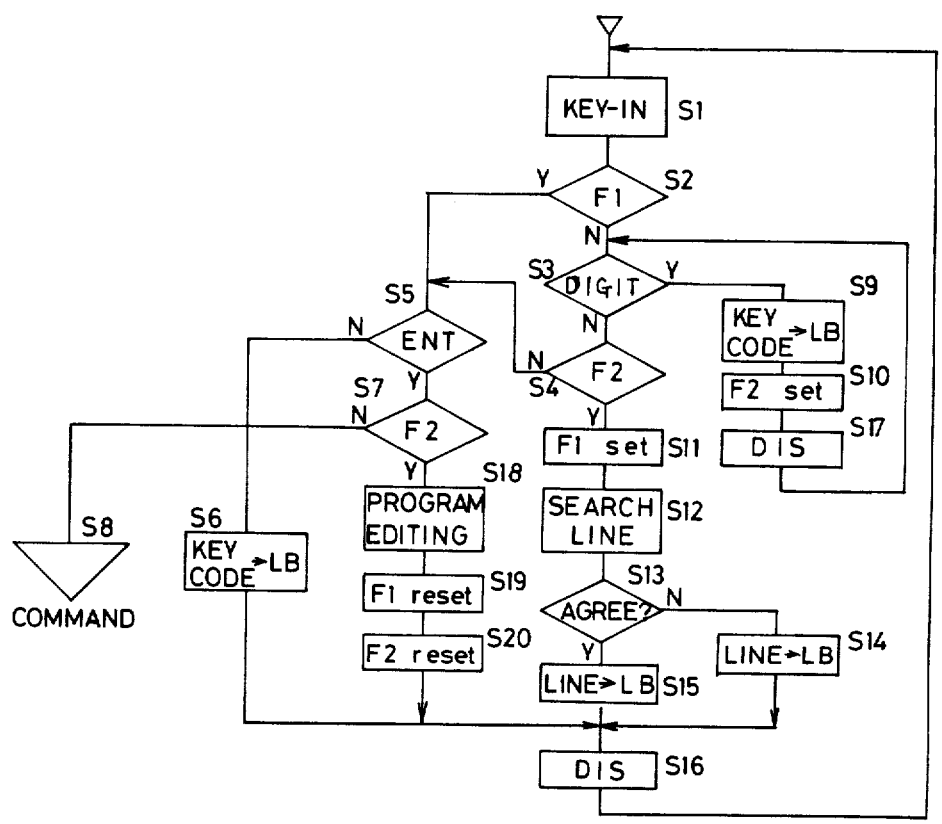
FIG. 3 is a flow chart for explaining operation of the computer.

FIG. 3 is a flow chart for explaining operation of the illustrated embodiment. Reference numbers and the contents of RAM 3 (see FIG. 1) will be described in some detail. Flags $F_1$ and $F_2$ are provided in a register/flag region 11 (FIG. 2) of CPU 1. $F_1$ stores any data from non-digit keys depressed after a particular line number has been inputted. $F_2$ storing the line numbers inputted via the keyboard. A buffer LB stores temporarily the input contents of the statements as well as the line identifying numbers and comprises a region of the input/output buffer 4 of FIG. 1.

For example, when a particular program is inputted via the keyboard, a line number and the body of a statement are stored as a string of character codes in the buffer LB for example:

10 INPUT A, SURYO

To the completion of input of a line in the program, the ENTER key is actuated at the end of the line. Upon actuation of the ENTER key the contents of the buffer LB, that is, a string of character codes, are converted into intermediate codes according to a fixed program stored in the read only memory ROM 2 of FIG. 1 and loaded into a predetermined region of RAM 3. The term intermediate codes used herein means codes which are stored in the RAM 3 of FIG. 1 as 2-byte codes after a particular instruction, e.g., "INPUT" is converted into 2-byte codes.

Figure 4:
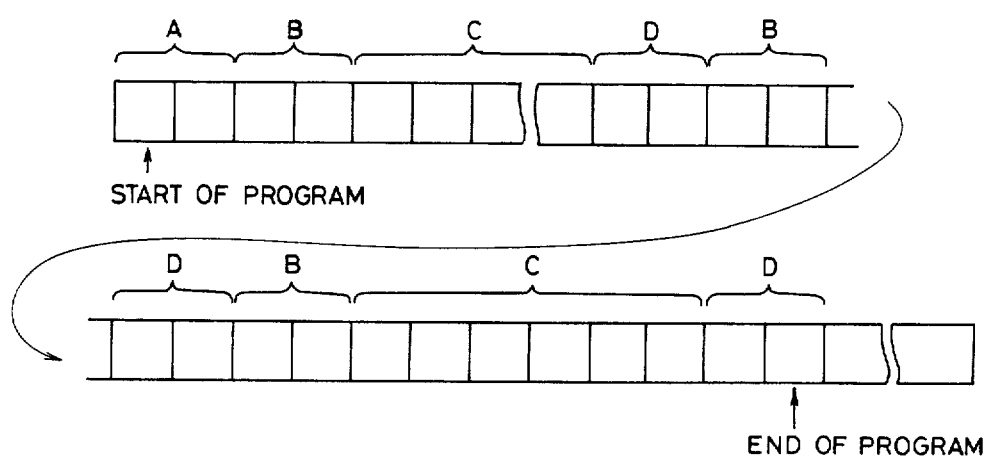
FIG. 4 is a view illustrating a program region to be stored in a RAM.

FIG. 4 illustrates a program stored in the above described RAM 3 (corresponding to RAM 3 in FIG. 1), wherein A represents address information (2 bytes) of the end of the program, B represents the intermediate codes for the line numbers, C represents the intermediate codes for the contents of the statement or statements, and D represents 2-byte codes indicating the end of each line (boundary). The lines are partitioned by the codes D and aligned in the order defined by the line numbers through program editing.

Operation of the computer will now be described with reference to the flow chart of FIG. 3.

(1) INPUT OF LINE STATEMENT (INSTRUCTION BUFFER LB)

In the initial stage, the flages $F_1$ and $F_2$ are in the reset state and key input procedure is conducted during step $S_1$. If the key actuated is not a digit key nor the ENTER key (specifying the end of any statement), then the input instruction (or command) is converted into codes which in turn are stored in the buffer LB ($S_1 \rightarrow S_2 \rightarrow S_3 \rightarrow S_4 \rightarrow S_5 \rightarrow S_6$).

(2) EXECUTION OF AN INSTRUCTION

After an instruction (or a statement) has been introduced via the keyboard, the ENTER key is depressed to execute that instruction.

(3) MODIFYING AND ALTERING STORED PROGRAM

When it is desired to modify a particular stored program or input a new program, a line number is introduced as an index for identifying a new statement. Step $S_3$ decides whether a digit key inputting the line number has been actuated, and the line number after being encoded is stored in the buffer LB (step $S_9$) and the flag $F_2$ is set (step $S_{10}$). The line number introduced is displayed ($S_{17}$).

Thereafter, when a key other than the digit keys is actuated to input a statement, the computer proceeds with steps $S_1 \rightarrow S_2 \rightarrow S_3 \rightarrow S_4$. Since the flag $F_2$ is in the set state through step $S_{10}$ the flag $F_1$ is placed into the set state through step $S_{11}$. In step $S_{12}$ a search is conducted through the line numbers (Codes B) and the codes D in the program area of RAM 3 to determine whether the intermediate code B of any line is the same and therefore of interest. Such search is conducted repeatedly up to the end of the program.

Through step $S_{12}$ the leading address information (fixed) in the program area of RAM 3 is fed into the address buffer 12 of FIG. 2 and the address information A relating to the end of the program (within RAM 3) is transferred into a desired one of the registers in device 11 of FIG. 2 by way of the accumulator 13. The contents of the address buffer 12 are incremented and transferred into another one of the registers 11 every 2 bytes at a time, whereby each intermediate code as described above may be transferred by way of the accumulator 13. The address buffer is incremented until the code transferred into the register 11 shows a line number. Whether seaching is completed throughout the program area is checked through comparison between the contents of the register receiving the address information A as shown in FIG. 4 and the contents of the address buffer 12. A line number code is retrieved from the contents of the program area of RAM 3 in this manner and whether it agrees with a new input line number is checked through step $S_{13}$. In the event that there is no stored line identified by the same line number, the key code for the input statement is introduced into the buffer LB (step $S_{14}$). If there is a stored statement having the same number, then the statement is fetched and loaded into the buffer LB. For example, when 120 is inputted inadvertently via the keyboard instead of an intended line number of 1200 and any key other than the digit keys is actuated, any statement with the line number 120 is displayed as long as the line number 120 is already stored.

(4) PROGRAM EDITING

Editing is used to eliminate a particular line or add a new line. If the ENTER key is actuated after a certain statement with a particular line number has been inputted, the contents of the particular statement is transferred into the buffer LB. Step $S_{18}$ performs program editing. For example, (a) when it is desired to delete a complete line, for example, all of line 10;
Key actuations required are as follows: 10 ENTER
(b) when it is desired to add a new line,
key actuations are as follows:
10 INPUT A, SURYO
20 END When it is desired to insert a new line between line numbers 10 and 20, line numbers of 11 through 19 may be assigned. For example, key actuations are as follows:

15 LET AMOUNT=*SURYO:DISP AMOUNT ENTER

In this manner, step $S_{18}$ performs program editing and steps $S_{19}$ and $S_{20}$ place the flags $F_1$ and $F_2$ into the reset state, thus completing the procedure in connection with one line ($S_5 \rightarrow S_7 \rightarrow S_{18} \rightarrow S_{19} \rightarrow S_{20}$).

While the computer executes the above described procedure, it is obvious that the indices may be implemented with alphabets or other abbreviated symbols.

While only a certain embodiment of the present invention has been described, it will be apparent to those skilled in the art that various changes and modifications may be made therein without departing from the spirit and scope of the invention as claimed.

What is claimed is:

1. A programmable computer comprising:
   input means for inputting a plurality of program statements and a plurality of statement identifiers associated with respective statements;
   memory means connected to said input means for storing said identifiers and associated statements;
   comparing means responsive to said input means for comparing an identifier input by said input means with identifiers previously stored in said memory means for determining if an identifier input by said input means is identical to any previously stored identifier;
   means responsive to said comparing means for storing in said memory means an input statement and an input associated identifier when said input identifier is not identical to any previously stored identifier; and
   display means responsive to said comparing means for displaying a statement stored in said memory means associated with an identifier which is the same as an identifier input by said input means.

2. A method for programming a data processing device comprising the steps of:
   inputting a plurality of program statements and statement identifiers associated with said respective statements;
   checking each statement identifier input to the device to determine if such input identifier is identical to any previously stored identifier by comparing each input identifier with previously stored identifiers;
   storing an input identifier along with its respective program statement if such input identifier is not identical to any previously stored identifier; and
   displaying to an operator a previously stored statement associated with a previously stored identifier which is the same as an input identifier.

3. A method as in claim 2, further comprising establishing a sequence in which said program statements are to be executed by the device by assigning sequential identifiers to said statements.

4. A method as in claim 2, comprising adding an additional statement to statements previously stored, including the steps of inputting said additional statement, inputting a new identifier which is different from all previously stored identifiers, and storing said new identifier and additional statement in the device.

5. A method as in claim 2, comprising revising a first statement which has been previously stored, including the steps of inputting a second identifier which is the same as a first identifier associated with said first statement;
   displaying said first identifier and first statement in response to input of said second identifier;
   inputting a revised statement; and
   storing said second identifier and said revised statement in the device in place of said first statement and first identifier.

* * * * *